(12) United States Patent
Chang et al.

(10) Patent No.: US 7,554,523 B2
(45) Date of Patent: Jun. 30, 2009

(54) PERIPHERAL DEVICE FOR IMAGE DISPLAY APPARATUS

(75) Inventors: Paul Chang, Taipei (TW); Yu-Chi Lin, Taipei (TW)

(73) Assignee: Inventec Corporation, Taipei (TW)

( * ) Notice: Subject to any disclaimer, the term of this patent is extended or adjusted under 35 U.S.C. 154(b) by 604 days.

(21) Appl. No.: 11/188,809

(22) Filed: Jul. 25, 2005

(65) Prior Publication Data

US 2007/0018949 A1 Jan. 25, 2007

(51) Int. Cl.
*G09G 5/00* (2006.01)
(52) U.S. Cl. ............... 345/156; 345/169; 348/207.1
(58) Field of Classification Search ............. 345/156, 345/204, 473, 431, 169; 348/376, 373, 374, 348/207.1; 455/559, 575, 90
See application file for complete search history.

(56) References Cited

U.S. PATENT DOCUMENTS

| | | | |
|---|---|---|---|
| 6,118,653 A * | 9/2000 | Kim | 361/679.23 |
| 6,226,015 B1 * | 5/2001 | Danneels et al. | 345/473 |
| 6,879,337 B2 * | 4/2005 | Tatehana et al. | 348/14.02 |
| 2002/0044216 A1 * | 4/2002 | Cha | 348/376 |
| 2002/0137542 A1 * | 9/2002 | Masutani et al. | 455/556 |
| 2004/0056977 A1 * | 3/2004 | Kim | 348/376 |

* cited by examiner

*Primary Examiner*—Richard Hjerpe
*Assistant Examiner*—Mansour M Said
(74) *Attorney, Agent, or Firm*—Venable LLP; Cameron H. Tousi

(57) ABSTRACT

The present invention relates to a peripheral device for image display, which comprises a hollow spot for holding the peripheral device, which then comprises a base and a shaft, wherein the shaft was located on the base, of which the shaft and the slot are a hole and shaft assembly case and the shaft maintains its degree of freedom in the slot, wherein the base can not only rotate but also slide. In addition, the base comprises at least one positioning hole and the image display device comprises at least one positioning pin, when the positioning hole is fitted by the positioning pin, the degree of freedom of the rotation is thus restricted. In comparison with prior art, the ease of use is obvious, and the design flexibility is abundant.

9 Claims, 4 Drawing Sheets

PERIPHERAL DEVICE FOR IMAGE DISPLAY APPARATUS

BACKGROUND OF THE INVENTION

1. Field of the Invention

The present invention relates to a peripheral device for image display, particularly one used with image display apparatus.

2. Description of the Prior Art

With the advancement of digital technology, all kinds of image display and image taking equipment have flooded the market and made their ways into every aspect of human life. TVs and computer display panels are image display devices that are most popular, which include such varieties as Cathode Ray Tube (CRT) display, Thin Film Transistor Liquid Crystal Display (TFT LCD), Super Twisted Nematic Liquid Crystal Display (STN LCD), Field Emission display panel, Organic Electroluminescence display . . . etc., while Digital Cameras, Digital Videos, and Web Cameras are among the most popular devices for taking either still or moving images.

These devices bring a great deal of convenience and enjoyment to people. And the inter-dependence between the two kinds of equipment is becoming closer and closer that there are now devices combining the two on the market.

Please refer to FIG. 1. FIG. 1 shows a notebook computer with a built-in webcam, comprising a computer proper 11, a display panel 12, and a webcam base 13. The display panel 12 is connected with the computer proper 11 by pivots 14, opposite which and on the rim of the display panel 12 is a hook clip (not shown) that can be used to lock the display panel 12 to the computer proper 11, closing the two and fastening them in place. The webcam 15 is pivoted on the display panel 12 and can be swiveled to position for objects to be photographed. As the webcam base 13 must be free to swivel, if it is set at some midsection on the rim of the display panel 12, then the hook clip must be set on somewhere else, otherwise when an user flips open the display panel 12, the webcam base 13 will also be turned and swiveled. Thus, if the webcam base 13 is set at the middle of the display panel rim, hook clips must be added and set on the two ends of the display panel rim, greatly limiting the possibilities of the computer's contour design. In addition, the conventional webcam base 13 allows only the freedom of rotation rather than sliding up and down; therefore, the webcam 15 may not adequately aim at targeted object and become hard to use.

Summarizing above the conventional technology, when we add a revolvable video webcam, which is a peripheral device, to a notebook computer display panel, which is an image display device, we may run into the difficulty of aiming the webcam adequately at a targeted object. In addition, the application positions for hook clips on the notebook computer are so limited that design flexibility thus ceases to exist.

DESCRIPTION OF THE INVENTION

The main purpose of the present invention is to solve the problem of awkwardness and inflexibility in the process of integrating peripheral devices to the present image display devices, and as a consequence, a peripheral device for image display device is presented to solve the above problem.

In order to achieve this goal, the present invention presents a peripheral device of an image display apparatus, wherein the image display apparatus comprises a hollow slot to hold the peripheral device, which comprises a base and a shaft, wherein the shaft is located on the base. The shaft and the slot are a hole and shaft assembly and the shaft maintains a degree of freedom for sliding; therefore, the base can not only revolve but also slide. In addition, the base comprises at least one positioning hole and the image display apparatus comprises at least one positioning pin, wherein when the positioning pin is fitted into the positioning hole, the degree of freedom of the base is thus restricted.

The present invention is a peripheral device of an image display apparatus, wherein the base can not only rotate but also shift; therefore, it enjoys the advantage of ease of use. In addition, with the positioning hole and positioning pin to restrict the degree of freedom of rotation; therefore, the application spot for hook clip can be located at center to gain more design flexibility.

The detailed description and preferred embodiment of the present invention will be illustrated as follows.

DETAILED DESCRIPTION OF THE PREFERRED EMBODIMENT

Figure 1:
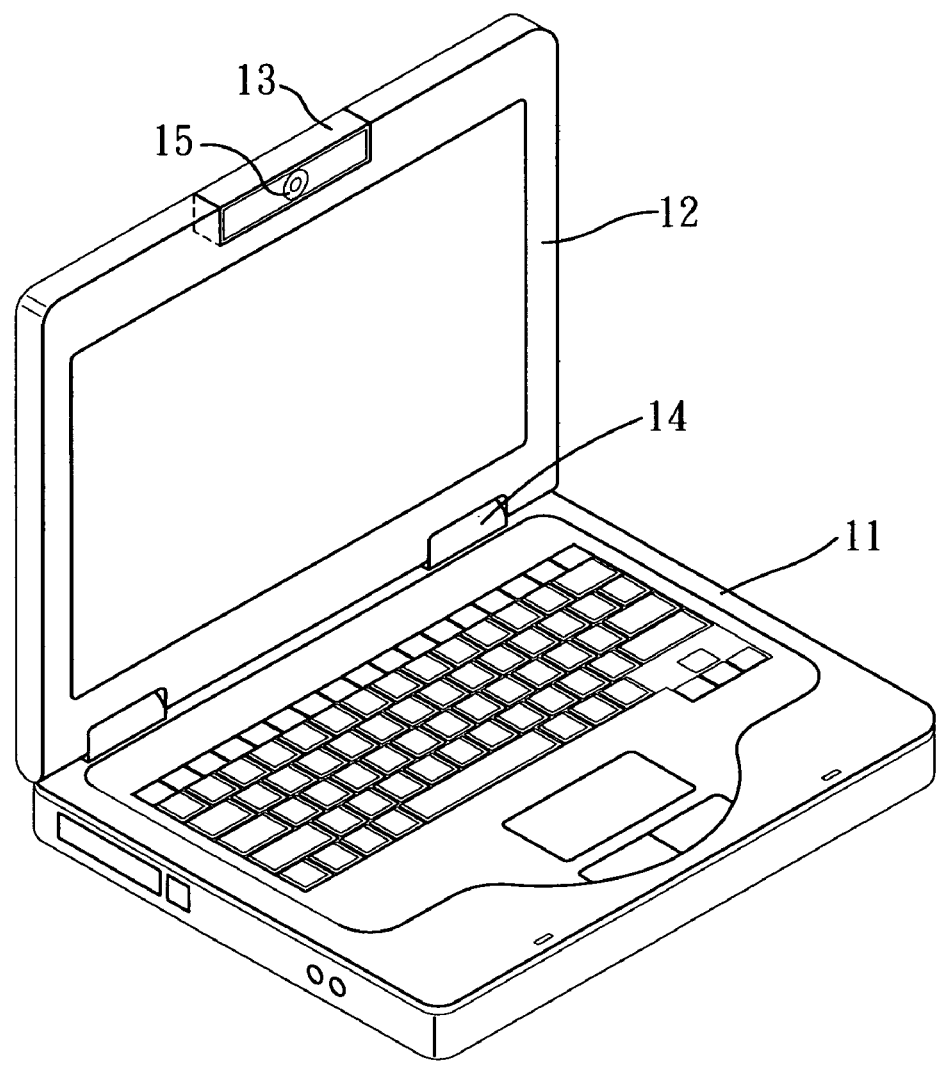
FIG. 1 is a conventional notebook computer with a video camera.
Figure 2:
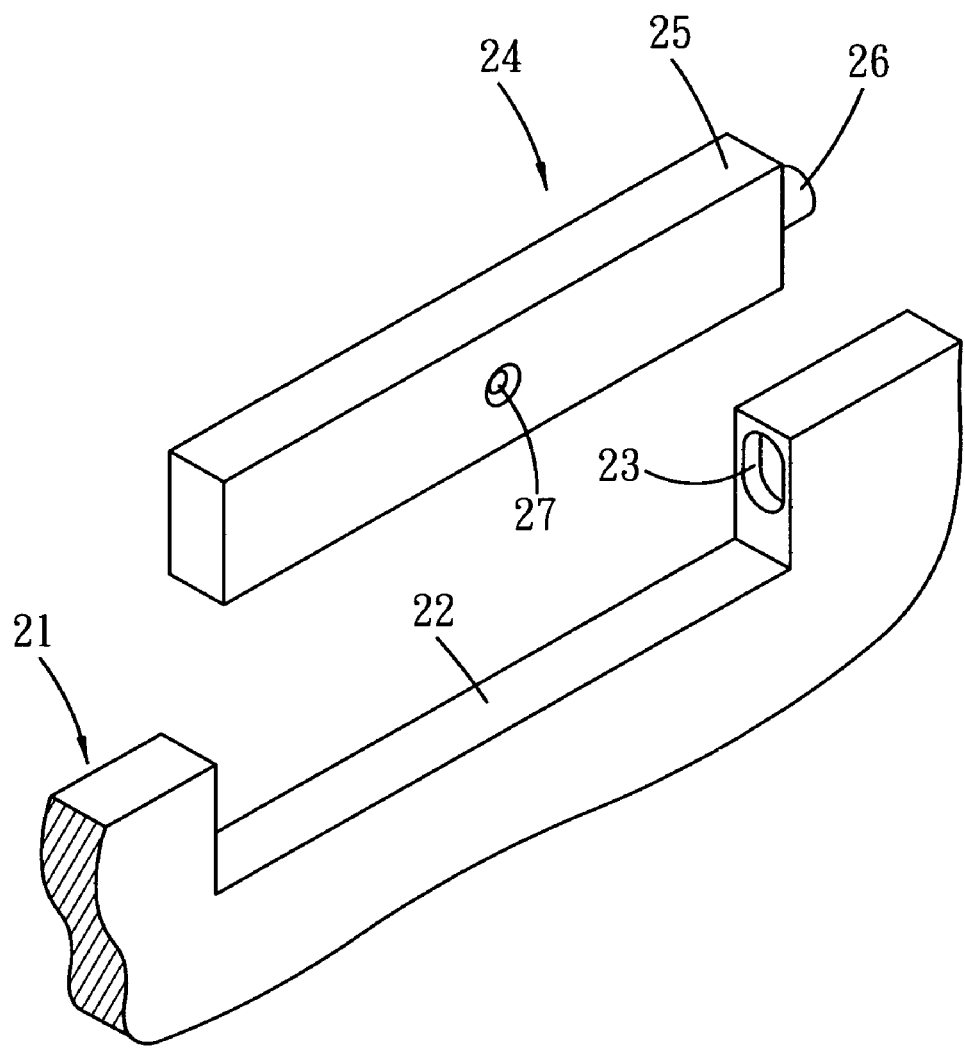
FIG. 2 is the illustrated diagram of the first preferred embodiment.

As shown in FIG. 2, it is the first preferred embodiment of the present invention, wherein a peripheral device of an image display apparatus is shown, of which the image display apparatus is a display 21 of a notebook computer, on which a hollow spot 22 is set to hold the peripheral apparatus 24; the hollow spot 22 can be located on either side of upper, lower, left, and right edges, wherein the hollow spot 22 comprises a slot 23 on one of the two opposite walls which form the hollow spot 22; the peripheral apparatus 24 comprises a base 25 and a shaft 26, which is located upon the base 25. The shaft 26 and the slot 23 are a shaft assembly and a hole, and the shaft 26 enjoys the degree of freedom of shifting in the slot 23. The peripheral apparatus 24 further comprises an image acquisition apparatus such as wireless web camera 27; consequently, the wireless web camera 27 may revolve or shift with the base 25, making the object accurately shoot; therefore, it enjoys the advantage of ease of use. The assembly of the shaft 26 and the slot 23 can be a tight fitting, which can make the base stay firmly on a certain spot after rotation or shifting.

Figure 3:
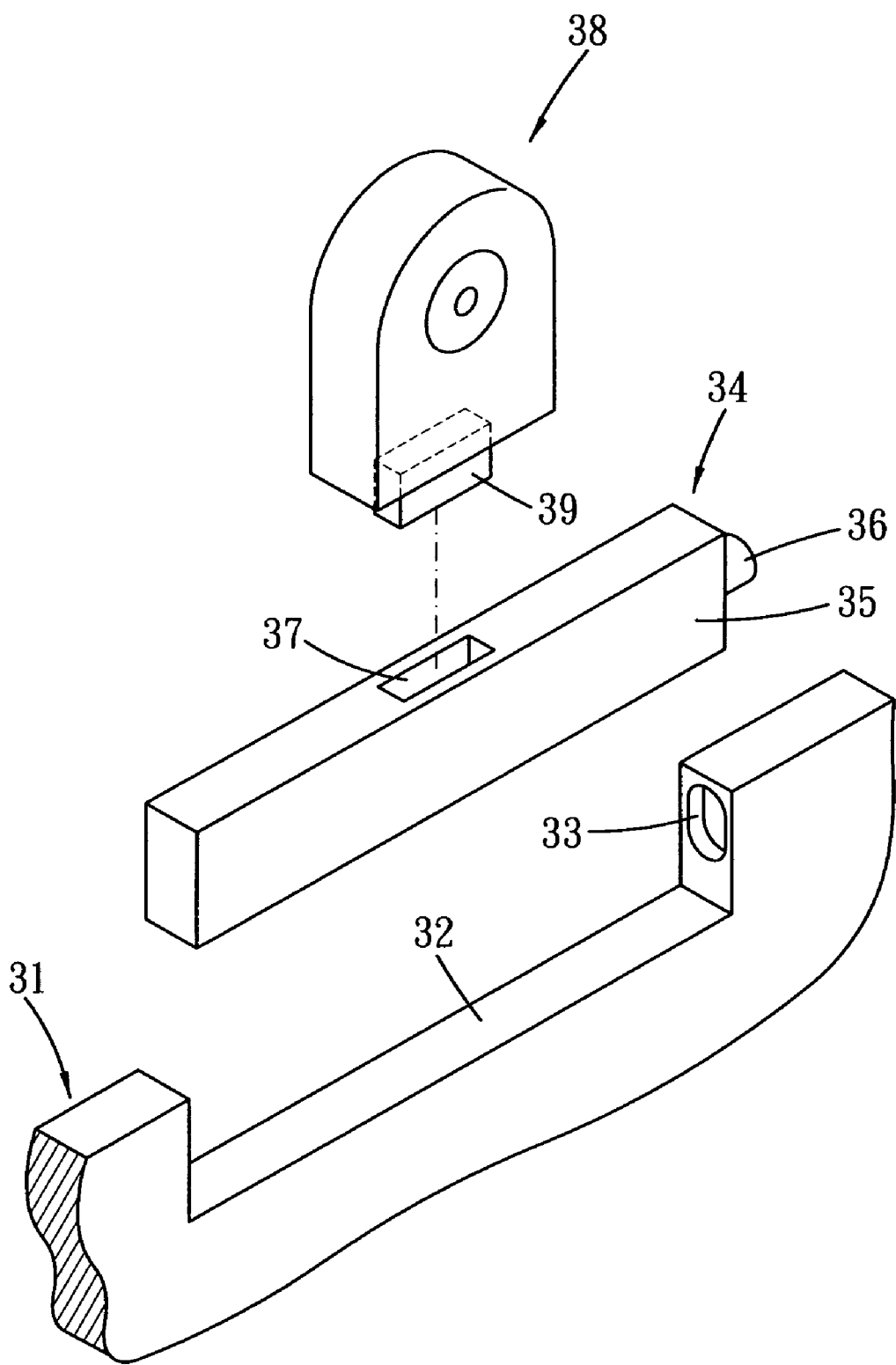
FIG. 3 is the illustrated diagram of the second preferred embodiment.

As shown in FIG. 3, it is the illustration of the assembly drawing of the second preferred embodiment, which is a peripheral device of an image display apparatus, wherein the image display apparatus is the display 31 of a notebook computer, where a hollow spot 32 is on it to hold the peripheral apparatus 34; the hollow spot 32 can be located on either side of upper, lower, left, or right edges of the display 31, wherein the hollow spot 32 comprises a slot 33; the peripheral apparatus 34 comprises a base 35 and a shaft 36, which is located upon the base 35. The base 35 further comprises a connection interface 37, offering connectivity to devices, wherein the connection interface 37 is an USB-compliant (Universal Serial Bus) one. The device is an image acquisition apparatus such as web camera 38 with an USB interface plug 39. The USB-compliant interface can be changed to an IEEE 1394 one. The shaft 36 and the slot 33 are a hole and shaft assembly, and the shaft 36 enjoys the degree of freedom of shifting in the slot 33; consequently, the web camera 38, which is installed on the base 35, can rotate and shift with the base, making the object accurately shoot; therefore, it enjoys the advantage of ease of use. The assembly of the shaft 36 and the slot 33 can be a tight fitting, which can make the base stay firmly on a certain spot after rotation or shifting.

Figure 4:
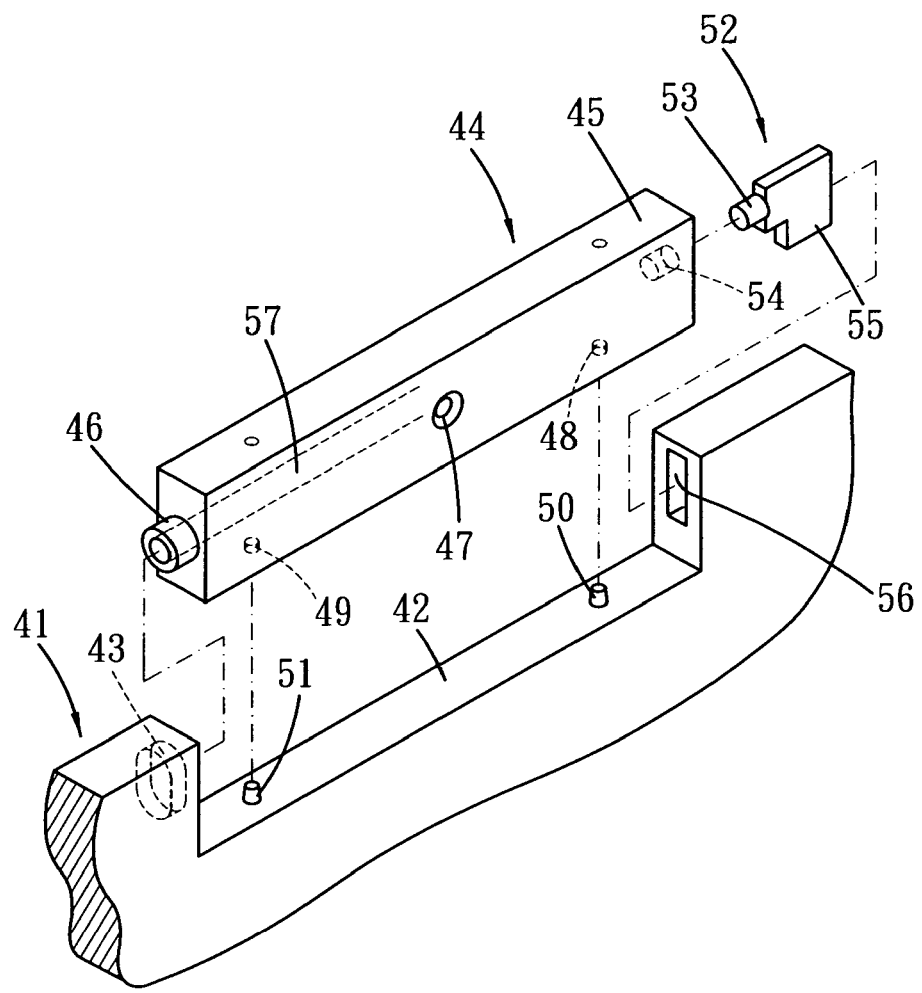
FIG. 4 is the illustrated diagram of the third preferred embodiment.

As shown in FIG. 4, it is the illustration of the assembly drawing of the third preferred embodiment, which is a peripheral device of an image display apparatus, wherein the image display apparatus is the display 41 of a notebook computer, where a hollow spot 42 is on it to hold the peripheral apparatus 44; the hollow spot 42 can be located on either side of upper, lower, left, or right edges of the display 41, wherein the hollow spot 42 comprises a slot 43; the peripheral apparatus 44 comprises a base 45 and a shaft 46, which is located upon the base 45. The shaft 46 and the slot 43 are a hole and shaft assembly, and the shaft 46 enjoys the degree of freedom of shifting in the slot 43; the peripheral apparatus 44 further comprises an image acquisition apparatus such as web camera 47; consequently, the web camera 47 can rotate or shift with the base 45, making the object accurately shoot; therefore, it enjoys the advantage of ease of use. The assembly of the shaft 46 and the slot 43 can be a tight fitting, which can make the base 45 stay firmly on a certain spot after rotation or shifting; in addition, the base 45 comprises two positioning holes 48, 49 and the display 41 comprises two positioning pins 50, 51, wherein the fittings of the positioning holes 48, 49 and positioning pins 50, 51 are used to confine the degree of freedom of rotation of the base 45; consequently, when a user open the display 41, the positioning holes 48, 49 and the positioning pins 50, 51 are in a state of fitting together, which can prevent the base 45 from toppling. When a user needs to rotate the base 45, he can raise the base 45 by way of shifting, bringing it to a state in which a rotation is possible; consequently, the hook clip of the notebook can be designed at the center spot of the display 41, without restricting the spot on which a hook clip is designed to locate, and no additional hook clips requirement or lost of design flexibility might happen. In addition, in order to set up the base 45 more firmly on the display 41, the preferred embodiment further comprises a connection device 52, one end of which comprises a cylindrical structure 53, which can be fitted into a round hole structure 54 on the base 45. The other end of the connection device 52 comprises a sliding block structure 55, which can slide in another slot 56 of the display 41; in addition, in order to hold the connection cables of the video camera 47, the base 45 and the shaft 46 also comprises a cavity structure 57, which let the connection cables of the video camera 47 run through the cavity structure, and extend to the display 41.

As shown herein, the peripheral device of the image display apparatus of the present invention enjoys an obvious advantage of ease of use in comparison with prior art, and the hook clip can be designed and located at the center spot to enjoy the flexibility of design.

The forgoing preferred embodiment of the present invention is an illustration, rather than a limiting description, of the present invention. As is understood by a person skilled in the art, various modifications and similar arrangements included within the spirit and scope can be carried out. It is intended to cover various modifications and similar arrangements included within the spirit and scope of the appended claims, the scope of which should be accorded the broadest interpretation so as to encompass all such modifications and similar structures.

What is claimed is:

1. A peripheral device of an image display apparatus, wherein said image display apparatus comprises a hollow spot for holding said peripheral device, and at least one of the two opposite walls which form the hollow spot has at least a slot, comprising:
    a base, comprising at least two positioning hole and said image display apparatus comprises at least two positioning pin, when said positioning hole is fitted by said two positioning pins, so that the degree of freedom of the rotation is thus restricted; and
    a shaft, wherein said shaft is located on said base, of which said shaft and said slot are a hole and shaft assembly and said shaft remains its degrees of freedom of shifting and rotating in said slot.

2. The peripheral device according to claim 1, wherein said base further comprises an image acquisition apparatus.

3. The peripheral device according to claim 2, wherein said image acquisition apparatus comprises a digital camera, digital video camera, or web camera.

4. The peripheral device according to claim 2, wherein said base and said shaft comprises a cavity structure, which holds the connection cables of said image acquisition apparatus.

5. The peripheral device according to claim 1, wherein said base further comprises a connection interface for the connection of said image acquisition apparatus.

6. The peripheral device according to claim 5, wherein said image acquisition apparatus comprises a digital camera, digital video camera, or web camera.

7. The peripheral device according to claim 5, wherein said connection interface is an IEEE1394-compliant female fitting.

8. The peripheral device according to claim 5, wherein said connection interface is a USB (Universal Serial Bus) -compliant female fitting.

9. The peripheral device according to claim 1, wherein said device further comprises a connection device, one end of which comprises a cylindrical structure, and the other end of said connection device comprises a sliding block structure.

\* \* \* \* \*